Figure 1:
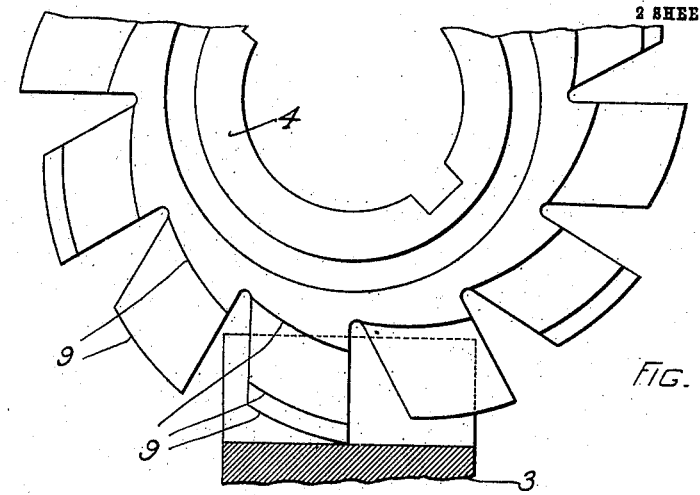

J. A. McGREGOR.
GANG MILLING CUTTER.
APPLICATION FILED FEB. 7, 1907.

963,464.

Patented July 5, 1910.
2 SHEETS—SHEET 1.

WITNESSES
L. E. Allen
Thos. C. Fried

INVENTOR
John A. McGregor
by N. A. Spencer
Attorney

J. A. McGREGOR.
GANG MILLING CUTTER.
APPLICATION FILED FEB. 7, 1907.
963,464.
Patented July 5, 1910.
2 SHEETS—SHEET 2.
FIG. 3.
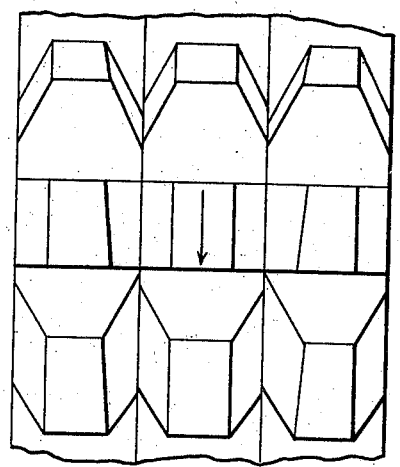
OLD FORM
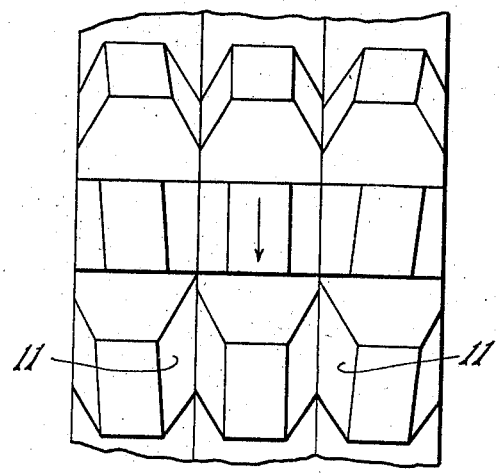
FIG. 4.
WITNESSES
INVENTOR
John A. McGregor

UNITED STATES PATENT OFFICE.

JOHN A. McGREGOR, OF ATHOL, MASSACHUSETTS, ASSIGNOR TO UNION TWIST DRILL CO., OF ATHOL, MASSACHUSETTS, A CORPORATION OF MASSACHUSETTS.

GANG MILLING-CUTTER.

963,464.  Specification of Letters Patent.  Patented July 5, 1910.

Application filed February 7, 1907. Serial No. 356,135.

*To all whom it may concern:*

Be it known that I, JOHN A. McGREGOR, of Athol, in the county of Worcester and State of Massachusetts, have invented certain new and useful Improvements in Gang Milling-Cutters, of which the following is a specification.

This invention relates to milling cutters and particularly to milling gangs for simultaneously cutting a plurality of gear teeth on arc shaped peripheries.

In cutting gear teeth great accuracy is required, especially for the production of standard parts, and variations in the size of teeth cut are obviously a serious matter.

The cutting tooth of gear milling cutters has usually been rearwardly tapered or relieved to afford clearance and this has been true not only on its periphery but also on its sides. Each tooth has, therefore, been of decreasing size in cross section so that as the face of the tooth was ground, the cutting size of the tooth became smaller not only as to height but as to width. This obviously changed the proportions of the gear cut and permitted inaccuracies, inconsistent with the standardized work.

It is the object of my invention to provide a gear cutter so arranged and constructed as to avoid to a considerable degree any modification of the teeth and especially the width of the teeth after grinding and further to provide means for the readjustment of the ground cutters to take care of such inaccuracies as should occur.

My invention will be more fully set forth in the specification which follows. In this specification I have described, and in the drawings have shown, a milling gang for cutting gear teeth on a circular or segmental blank.

Figure 2:
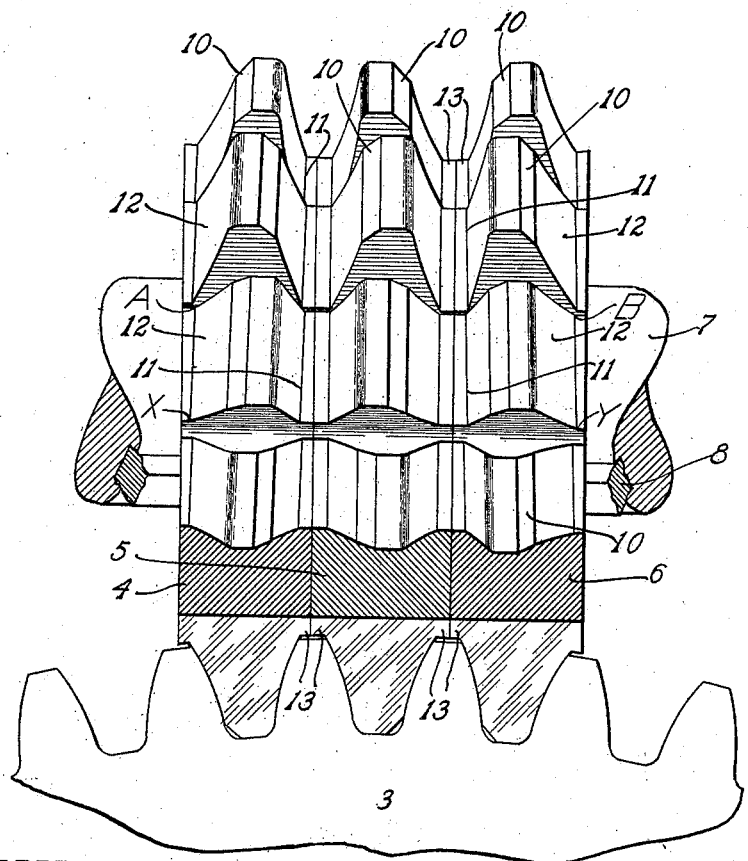

Throughout the specifications and drawings like reference numerals are employed to indicate corresponding parts and in the drawings: Figure 1 is a partial side view of my cutter at work, Fig. 2 is a front view of a gang of cutters partly broken away to show the teeth in the work. Fig. 3 is a view of a portion of a cutter gang showing the old way of forming teeth, and Fig. 4 is a similar view of my new tooth construction.

The blank 3 has a segmental edge upon which are being cut a plurality of teeth by a gang of three cutters, 4, 5 and 6. These cutters, mounted side by side on an arbor 7 are held in position thereon by any suitable means, as by a key indicated at 8. The center cutter 5 is constructed to work in a plane perpendicular to its axis of rotation and it, therefore, has its teeth on its working edge arranged symmetrically with regard to such a perpendicular plane.

The side cutters 4 and 6, each have their working edges disposed in a plane radial to the blank 3, and consequently in a plane inclined to their own axis of rotation. This provides for the suitable radial position of the gear tooth. Each tooth of the cutters is given a radial clearance 9 in its backing so as to afford a free cutting edge.

In order to give the teeth proper lateral clearance I construct my side cutters such as 4 and 6 in the following manner. The teeth of each of these cutters are successively obliquely disposed so that the forward or working face of each tooth is slightly staggered with relation to the rear end of the tooth which precedes it.

I make each tooth of my cutters of uniform thickness from side to side. This, I find possible on account of the rearward clearance of each tooth, on account of its radial relief and also on account of the slight relief in the cut made by the lateral cutters which are tipped slightly from the vertical. This slight relief in the cut permits the oblique positioning of the teeth of the lateral cutters in order to secure lateral clearness without changing the uniformity of breadth of the teeth.

Referring to Fig. 2 it will be seen that the inside surface 11 of each tooth while slightly inclined is still parallel to the corresponding outside surface 12. The reduced portion 10 alternately positioned on each tooth on the side opposite to its end cutting edge is simply an additional clearance and reduction of the cutting area so as to reduce the chip and distribute to a better advantage the cutting pressure.

I preferably arrange my lateral cutters so that their corresponding teeth form converging pairs with relation to the center cutters. I preferably position one lateral cutter with its teeth slightly in advance of the central cutter and position the cutter on the opposite side with its teeth slightly to the rear of the central cutter for the purpose of relieving the strain. Theoretically, however, the lateral cutters have their corresponding blades preferably in successive converging pairs. The convergence of these pairs makes possible of course, a slight error in grinding, as the forward edge A—B of a pair of lateral cutters is, of course closer together than the rear edge X—Y. This I overcome by providing each cutter with a projecting hub 13. The face of this hub may be ground away as the teeth are ground in order to preserve the relation of the lateral teeth to the central cutter.

It will, therefore be seen that by the construction of my cutter I am enabled to provide for a continued grinding without any appreciable error on account of the fact that the cutters have teeth which work radially with relation to their own axis of rotation. Further I have provided for the readjustment of the cutters to overcome such error should it actually occur.

Various modifications in the construction and arrangement in number and assemblage of the parts of my device may be made without departing from the spirit of my invention if within the limits of the appended claims.

What I, therefore, claim and desire to secure by Letters Patent is:—

1. A gear milling gang comprising a central cutter having perpendicularly operative cutting teeth and one or more cutters on each side having their cutting teeth radially disposed to the work, each cutter having its teeth of uniform thickness from front to rear and successively disposed in the same oblique direction, said side cutters being so arranged that their corresponding teeth will form converging pairs with relation to the center cutter and means for spacing said side cutters apart relative to said central cutter.

2. A gear milling gang comprising a central cutter having perpendicularly operative cutting teeth and one or more cutters on each side having their cutting teeth radially disposed to the work, each cutter having its teeth of uniform thickness from front to rear and successively disposed in an oblique direction, said side cutters being so arranged that their corresponding teeth will form converging pairs with relation to the center cutter.

3. A gear milling gang comprising a cutter having perpendicularly operative cutting teeth and a side cutter having its cutting teeth radially disposed to the work, said teeth being of uniform thickness from front to rear and successively disposed in oblique direction.

4. In a milling gang for cutting slots on a curved blank, a rotatable cutter having teeth of uniform thickness from front to rear and set at an angle to its axis of rotation, each of said teeth being obliquely disposed with its working face directed inward.

In testimony whereof I have affixed my signature, in presence of two witnesses.

JOHN A. McGREGOR.

Witnesses:
W. G. LUNGER,
GEO. R. PAIGE.